United States Patent
Nagamatsu et al.

(10) Patent No.: US 8,220,000 B2
(45) Date of Patent: *Jul. 10, 2012

(54) SYSTEM AND METHOD FOR EXECUTING FILES STORED IN LOGICAL UNITS BASED ON PRIORITY AND INPUT/OUTPUT LOAD OF THE LOGICAL UNITS

(75) Inventors: Kazushige Nagamatsu, Odawara (JP); Hiroji Shibuya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,919

(22) Filed: Jul. 1, 2011

(65) Prior Publication Data
US 2011/0264619 A1    Oct. 27, 2011

Related U.S. Application Data

(63) Continuation of application No. 11/266,343, filed on Nov. 4, 2005, now Pat. No. 7,987,466.

(30) Foreign Application Priority Data

Aug. 22, 2005  (JP) ................................ 2005-240353

(51) Int. Cl.
 *G06F 9/46* (2006.01)
 *G06F 12/00* (2006.01)
 *G06F 5/00* (2006.01)
(52) U.S. Cl. ........... 718/105; 718/103; 707/822; 710/52
(58) Field of Classification Search ........................ None
See application file for complete search history.

(56) References Cited

U.S. PATENT DOCUMENTS

| | | | |
|---|---|---|---|
| 5,276,867 A | 1/1994 | Kenley et al. | |
| 5,469,560 A | 11/1995 | Beglin | |
| 5,905,866 A | 5/1999 | Nakabayashi et al. | |
| 6,031,978 A | 2/2000 | Cotner et al. | |
| 6,173,306 B1 | 1/2001 | Raz et al. | |
| 6,801,943 B1 | 10/2004 | Pavan et al. | |
| 7,240,122 B2 | 7/2007 | Sato | |
| 7,240,152 B2 | 7/2007 | Nakayama et al. | |
| 2002/0032788 A1 | 3/2002 | Emanuel et al. | |
| 2002/0083120 A1 | 6/2002 | Soltis | |

(Continued)

FOREIGN PATENT DOCUMENTS

JP    10-011344    1/1998

(Continued)

OTHER PUBLICATIONS

Japanese Office Action—Notice of Reasons for Rejection, dated Jan. 28, 2011 issued in corresponding JP Application No. 2005-240353.

*Primary Examiner* — Camquy Truong
(74) *Attorney, Agent, or Firm* — Brundidge & Stanger, P.C.

(57) ABSTRACT

A storage system including a plurality of logical units; file management application software for performing file management on a per-file basis for a plurality of files stored in the respective logical units; a load monitoring module for monitoring a load in a resource of the storage system; and a file management control module for controlling the file management application software based on the load monitored by the load monitoring module.

18 Claims, 11 Drawing Sheets

| U.S. PATENT DOCUMENTS | | | | FOREIGN PATENT DOCUMENTS | | |
|---|---|---|---|---|---|---|
| 2002/0156887 A1 | 10/2002 | Hashimoto | | JP | 2003-44332 | 2/2003 |
| 2003/0023665 A1 | 1/2003 | Matsunami et al. | | JP | 2003-162439 | 6/2003 |
| 2003/0105767 A1 | 6/2003 | Sonoda et al. | | JP | 2003-208362 | 7/2003 |
| 2003/0135782 A1 | 7/2003 | Matsunami et al. | | JP | 2004-151825 | 5/2004 |
| 2004/0193827 A1 | 9/2004 | Mogi et al. | | JP | 2004-227098 | 8/2004 |
| 2004/0260875 A1 | 12/2004 | Murotani et al. | | JP | 2004-259045 | 9/2004 |
| 2005/0050544 A1 | 3/2005 | Saito et al. | | JP | 2004-528651 | 9/2004 |
| 2005/0114297 A1 | 5/2005 | Edwards | | JP | 2005-084963 | 3/2005 |
| 2005/0267950 A1 | 12/2005 | Kitamura | | WO | 02/086717 | 10/2002 |

| 401 | 402 | 403 | 404 | 405 | 406 | 407 | 408 | 409 |
|---|---|---|---|---|---|---|---|---|
| MANAGEMENT NUMBER | LUN | PRIORITY | LOAD STAUS | EXECUTION RANKING | EXECUTION RESULT | RESUMPTION MARKER | SKIP COUNT | LU TYPE |
| | | | | | | | | |

| 411 | 412 | 413 | 414 | 415 |
|---|---|---|---|---|
| UTILIZATION | UTILIZATION | UTILIZATION | I/O RATE | I/O RATE |
| | | | | |

| 421 | 422 | 423 | 424 | 425 | 426 | 427 |
|---|---|---|---|---|---|---|
| LUN | CONNECTED HOST NAME | ADMINISTRATOR'S E-MAIL ADDRESS | CONNECTION I/F | PG-1 | PG-2 | ... | PG-N |
| | | | | | | |

| WAIT TIME | WAIT TIME | THRESHOLD | NUMBER OF FILES |
|---|---|---|---|
| 431 | 432 | 433 | 434 |
| | | | |

| FILE PATH | VIRUS NAME |
|---|---|
| 441 | 442 |
| | |

| MANAGEMENT NUMBER | LU NUMBER | PRIORITY | LOAD STATUS | EXECUTION RANKING | EXECUTION RESULT | RESUMPTION MARKER | SKIP COUNT | LU TYPE |
|---|---|---|---|---|---|---|---|---|
| 1 | 01.00 | 3 | | | 0 | 0 | NAS | |
| 2 | 01.01 | 4 | | | 0 | 0 | iSCSI | |
| 3 | 01.02 | 1 | | | 0 | 0 | iSCSI | |
| 4 | 01.03 | 5 | | | 0 | 0 | SAN | |
| 5 | 01.04 | 2 | | | 0 | 0 | NAS | |

| MANAGEMENT NUMBER | LU NUMBER | PRIORITY | LOAD STATUS | EXECUTION RANKING | EXECUTION RESULT | RESUMPTION MARKER | SKIP COUNT | LU TYPE |
|---|---|---|---|---|---|---|---|---|
| 1 | 01.00 | 3 | 0 | 2 | | 0 | NAS | |
| 2 | 01.01 | 4 | 0 | 3 | | 0 | iSCSI | |
| 3 | 01.02 | 1 | 0 | 1 | | 0 | iSCSI | |
| 4 | 01.03 | 5 | 1 | 5 | | 0 | SAN | |
| 5 | 01.04 | 2 | 1 | 4 | | 0 | NAS | |

| MANAGEMENT NUMBER | LU NUMBER | PRIORITY | LOAD STATUS | EXECUTION RANKING | EXECUTION RESULT | RESUMPTION MARKER | SKIP COUNT | LU TYPE |
|---|---|---|---|---|---|---|---|---|
| 1 | 01.00 | 3 | 0 | 2 | 50 | 1 | NAS | |
| 2 | 01.01 | 4 | 0 | 3 | 100 | 0 | iSCSI | |
| 3 | 01.02 | 1 | 0 | 1 | 100 | 0 | iSCSI | |
| 4 | 01.03 | 5 | 1 | 5 | 0 | 1 | SAN | |
| 5 | 01.04 | 2 | 1 | 4 | 0 | 1 | NAS | |

SYSTEM AND METHOD FOR EXECUTING FILES STORED IN LOGICAL UNITS BASED ON PRIORITY AND INPUT/OUTPUT LOAD OF THE LOGICAL UNITS

CROSS-REFERENCES TO RELATED APPLICATIONS

This application relates to and claims priority from Japanese Patent Application No. 2005-240353, filed on Aug. 22, 2005 and is a continuation of U.S. application Ser. No. 11/266,343, filed Nov. 4, 2005 now U.S. Pat. No. 7,987,466, the entire disclosures of which are incorporated herein by reference.

BACKGROUND OF THE INVENTION

The present invention relates to a storage system, and more particularly relates to a storage system suitable for file management.

JP-A-2003-208362 discloses a SAN/NAS integrated storage system having a block I/O interface and a file I/O interface. A block I/O interface handles I/O requests on a per-disk-block basis (block access requests). An FC (Fibre Channel), a SCSI (Small Computer System Interface), an iSCSI (internet SCSI), an ESCON (Enterprise System Connection: registered trademark) or similar can be included in the block I/O interface. A system where a plurality of host systems and a plurality of storage systems are mutually connected via the block 20 I/O interface such as one using a Fibre Channel is called a SAN (Storage Area Network).

Meanwhile, a file I/O interface handles I/O requests on a per-file basis based on a file transfer protocol (file access requests). An NFS (Network File System), a CIFS (Common Interface File System) and the like are known as file transfer protocols between a file server and a client. A storage system that can be connected to a network such as an IP (Internet Protocol) network via the file I/O interface is called NAS (Network Attached Storage).

A SAN/NAS integrated storage system receives I/O requests from a plurality of host systems via a SAN, an IP network, or similar.

In conventional storage systems, host systems have performed batch processing on a per-file basis such as virus checking or data backup for disk drives within the storage systems.

SUMMARY OF THE INVENTION

However, when host systems perform the above-described batch processing on a per-file basis, they have to read out all files in a disk drive and accordingly have a considerably heavy load. If the host systems provide application services such as a mail service while handling the above-described processing involving a heavy load, the processing performances of those application services will deteriorate.

Furthermore, in a SAN/NAS integrated storage system connected to a plurality of host systems via a SAN, an IP network, or similar, several host systems may, in some cases, conduct the above-described per-file batch processing during the same period of time, which causes load concentration in the storage system. That load concentration in the storage system deteriorates the processing performance of the storage system itself.

Thus, in order to solve the above-described problems, the present invention aims to propose a storage system that enables the performance of batch processing on a per-file basis without host systems being heavily loaded, and further enables load balancing in the storage system.

In order to achieve the above objects, a storage system according to this invention includes: a plurality of logical units; file management application software for performing a file management on a per-file basis for a plurality of files stored in the respective logical units; a load monitoring module for monitoring a load in a resource of the storage system; and a file management control module for controlling the file management application software based on the load monitored by the load monitoring module. Since the file management control module controls the file management application software based on the resource load in the storage system, it is possible to balance the load in the storage system.

As the file management application software, software that includes processing putting a heavy load on the storage system resources, such as processing to manage a plurality of files in a batch, may be suitable. Such processing involving a heavy load is performed by the storage system in place of host systems, so the load in the host systems can be decreased.

As the resource load, for example, an I/O load for each of the logical units may be used.

According to a preferred embodiment of this invention, the storage system further includes a file management table for managing a file management priority for each of the logical units, the I/O load for each of the logical units, and a file management execution ranking for each of the logical units. The file management control module determines the execution ranking by raising the file management priority of one of the plurality of logical units if the I/O load of the one logical unit does not exceed a predetermined threshold. The file management priority may be, for example, determined by an administrator in advance. By determining the file management execution ranking in accordance with the file management priority and the I/O load of the respective logical units, it is possible to balance the resource load.

The file management control module controls start/stop of the file management application software; mounting/unmounting of one or more file management target logical units from among the logical units; and resumption of the file management.

When the I/O load of one of the plurality of logical units reaches or exceeds a predetermined threshold, the file management control module unmounts the one logical unit to suspend the file management for the one logical unit. By that operation of letting file management for a heavily loaded logical unit be performed later, it is possible to divide the resource load.

When the I/O load of the one of the plurality of logical units becomes less than a predetermined threshold, the file management control module re-mounts the unmounted one logical unit to resume the file management for the one logical unit.

The file management control module may be configured to stop the file management for the one of the plurality of logical units if the number of file management suspensions for the one logical unit reaches or exceeds a predetermined threshold, and to perform the file management for another of the plurality of logical units. When the number of file management suspensions reaches or exceeds a predetermined threshold, it can be considered that the target logical units constantly have a heavy load, and so it is preferable to prioritize file management for other logical units.

According to a preferred embodiment of this invention, the storage system further includes one or more block I/O interfaces and one or more file I/O interfaces. One or more of the logical units are provided to a SAN client, such as an FC-SAN client or an iSCSI client, via the block I/O interfaces, and another or more of the logical units are provided to a NAS client via the file I/O interfaces.

The file management application software, the load monitoring module, and the file management control module preferably run on; for example, the file I/O interfaces.

If the load in one of the file I/O interfaces reaches or exceeds a predetermined threshold, the one file I/O interface mounts the logical units via another of the file I/O interfaces or the block I/O interfaces, and controls the file management. In this way, it is possible to balance the load in the storage system.

The storage system performs I/O processing in response to a request from the SAN client or the NAS client, and also performs the file management in a background. As stated above, by distributing the load among the storage system resources, the storage system can respond to I/O requests from the host systems based on their normal operations and at the same time perform file management without difficulty.

Preferably, the file management control module reports a file management processing result to an administrator by e-mail. Items to be reported are, for example, information that file management for a logical unit has been suspended because of its heavy load, or information that a virus has been detected as a result of virus checking.

As file management application software, virus checking software, backup software, or similar, may be used.

According to this invention, it is possible to perform batch processing on a per-file basis without host systems being heavily loaded, and also possible to balance the load in a storage system.

BRIEF DESCRIPTION OF THE DRAWINGS

FIG. 4 is an explanatory diagram of a file management table;

FIG. 5 is an explanatory diagram of a threshold management table;

FIG. 6 is an explanatory diagram of an LU management table;

DETAILED DESCRIPTION OF THE INVENTION

An embodiment of this invention is described below in detail with reference to the attached drawings.

Figure 1:
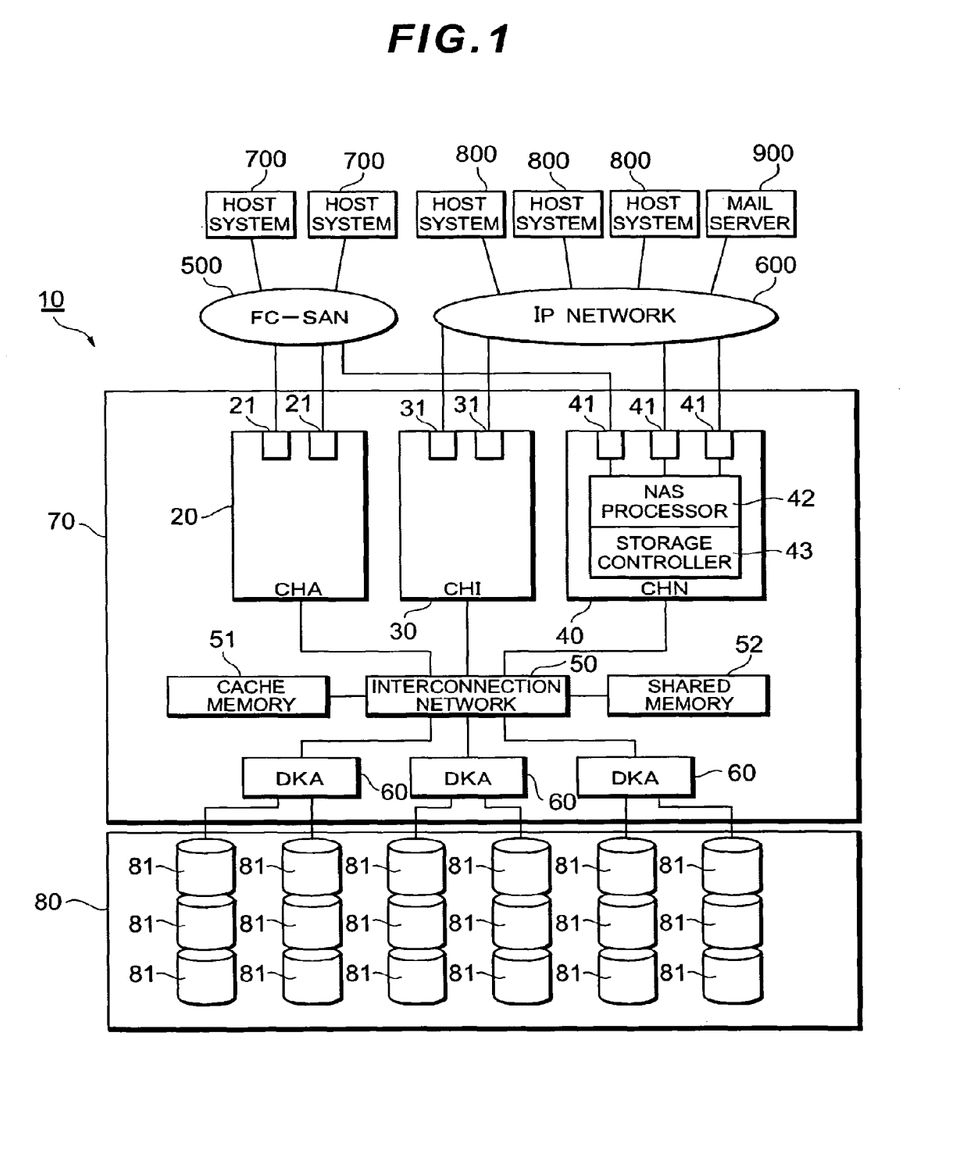
FIG. 1 is a system configuration diagram of a storage system according to the present embodiment.

FIG. 1 shows a system configuration of a storage system 10 according to the present embodiment. The storage system 10 is a SAN/NAS integrated storage system that is connected to host systems 700 via a FC-SAN (Fibre Channel Storage Area Network) 500 and also connected to host systems 800 and a mail server 900 via an IP network 600.

The host systems 700 are SAN clients making block access requests to the storage system 10 based on Fibre Channel Protocol or the like. The host systems 800 are NAS clients making file access requests to the storage system 10 based on a file transfer protocol such as NFS or CIFS. The host systems 700 and 800 run, for example, Web application software, streaming application software, e-business application software, or similar. The host systems 700 and 800 are personal computers, workstations, mainframe computers, or similar. The host systems 700 and 800 may be Windows® systems, or UNIX® systems, or a combination involving both. The mail server 900 informs an administrator of the results of file management processing executed for the storage system 10.

The storage system 10 includes a storage control apparatus 70 and a memory apparatus 80. The storage control apparatus 70 has a plurality of channel adapters 20, 30 and 40, an interconnection network 50, a cache memory 51, a shared memory 52, and a plurality of disk adapters 60. The memory apparatus 80 has a plurality of memory devices 81.

The channel adapter (CHA) 20 has a plurality of ports 21 connected to the FC-SAN 500 and provides the host systems 700 with a block I/O interface (SAN interface) based on Fibre Channel Protocol. The channel adapter (CHI) 30 has a plurality of ports 31 connected to the IP network 600 and provides the host systems 800 with a block I/O interface (iSCSI interface) based on an iSCSI (internet Small Computer System Interface) protocol. The channel adapter (CHN) 40 has a plurality of ports 41 connected to the FC-SAN 500 or the IP network 600, and provides the host systems 700 and 800 with a file I/O interface (NAS interface) based on a file transfer protocol.

The channel adapter 40 further includes a NAS processor 42 and a storage controller 43. The NAS processor 42 is a dedicated processor used for file access processing in response to file access requests from the host systems 700 and 800. By the file access processing by the NAS processor 42, the channel adapter 40 functions as a file server. The storage controller 43 sends I/O requests to the memory devices 81 in response to the file access requests. The storage controller 43 transmits/receives data and commands to/from the cache memory 51, the shared memory 52 and the disk adapters 60.

The channel adapters 20, 30 and 40 are configured as a computer system (adapter board) where one or more circuit boards with a CPU and memory mounted thereon are integrated.

For ease of explanation, the channel adapters 20, 30 and 40 may be herein also referred to as CHA, CHI and CHN respectively.

The disk adapters (DKA) 60 control data write/read to/from the memory devices 81. The disk adapters 60, in response to write commands from the host systems 700 and 800, write the write data in a certain address in a certain memory device 81. Furthermore, the disk adapters 60 read out data from a certain memory device 81 in response to read commands from the host systems 700 and 800. Upon the data write/read to/from the memory devices 81, the disk adapters 60 convert logical addresses into physical addresses. If the memory devices 81 are managed in accordance with a RAID configuration, the disk adapters 60 perform data access according to the relevant RAID level.

The disk adapters 60 are configured as a computer system (adapter board) where one or more circuit boards with a CPU and memory mounted thereon are integrated.

The cache memory 51 temporarily stores data received from the host systems 700 and 800, and also temporarily stores data read out from the memory devices 81.

The shared memory 52 stores information concerning the configuration and load of the storage system 10, and also stores various kinds of commands transmitted between the disk adapters 60 and the channel adapters 20, 30 and 40.

For example, receiving a write command from the host systems 700 and 800, the channel adapters 20, 30 and 40 write that write command in the shared memory 52 and also write the write data received from the host systems 700 and 800 in the cache memory 51. Meanwhile, the disk adapters 60 constantly monitor the shared memory 52, and if they find that a write command has been written in the shared memory 52, they read out dirty data from the cache memory 51 in accordance with that write command and destage it to the relevant memory devices 81.

Furthermore, receiving a read command from the host systems 700 and 800, the channel adapters 20, 30 and 40 check if the read data is in the cache memory 51 or not. If the read data is in the cache memory 51, the channel adapters 20, 30 and 40 read that read data from the cache memory 51 and send it to the host systems 700 and 800. If the read data is not in the cache memory 51, the channel adapters 20, 30 and 40 write the read command in the shared memory 52. The disk adapters 60 constantly monitor the shared memory 52, and if they find that a read command has been written in the shared memory 52, the disk adapters 60 read out the read data from the memory devices 81 and write it in the cache memory 51, and also write in the shared memory 52 that the read data has been written in the cache memory 51. Then, the channel adapters 20, and 40 find that the target read data has been written in the cache memory 51, read out that read data from the cache memory 51, and send it to the host systems 700 and 800.

The interconnection network 50 mutually connects the channel adapters 20, 30 and 40, the cache memory 51, the shared memory 52 and the disk adapters 60. The interconnection network 50 is, for example, a high-speed bus, such as a super high-speed crossbar switch that transmits data by high-speed switching.

The memory devices 81 are, for example, physical devices such as hard disk drives, flexible disk drives, magnetic tape drives, semiconductor memory drives, or optical disk drives. The memory apparatus 80 may also include different kinds of disks such as FC disks or SATA (Serial AT Attachment) disks.

Figure 2:
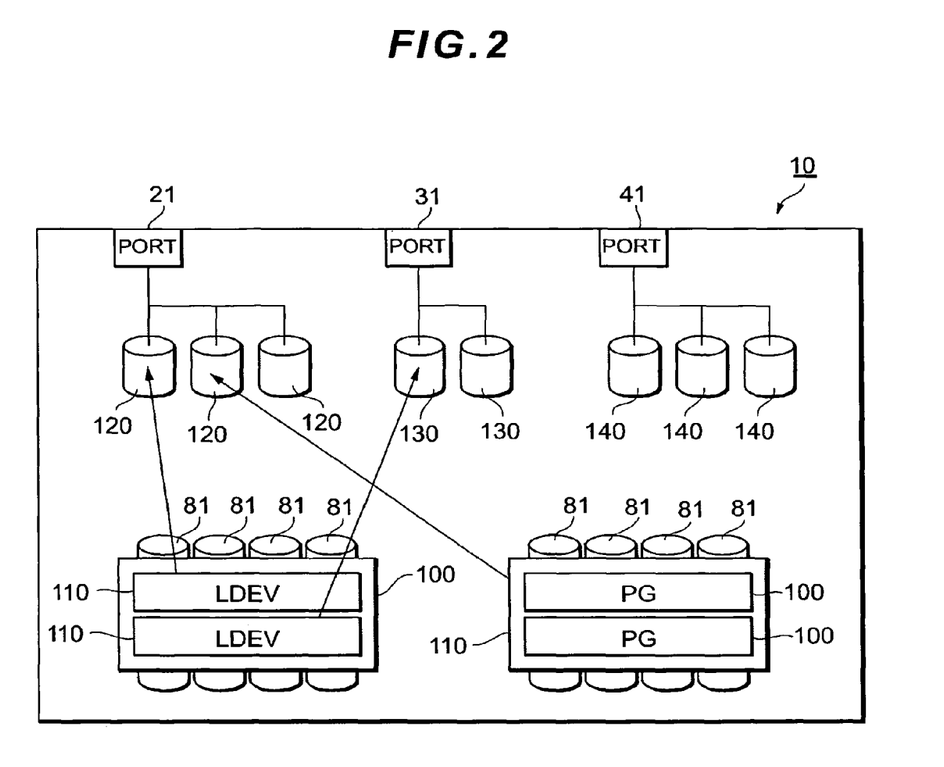
FIG. 2 is an explanatory diagram of storage hierarchies in the storage system according to the present embodiment.

FIG. 2 shows the storage hierarchies in the storage system 10. The same reference numerals used in FIG. 1 indicate the same devices, and so their detailed explanation is omitted.

A parity group 100 is configured by, for example, putting four memory devices 81 together to form one group (3D+1P), or putting eight memory devices 81 together to form one group (7D+1P). In other words, the respective storage areas provided by the plural memory devices 81 are collected together to constitute one parity group 100. The parity group 100 may also be called a RAID group or an ECC group.

One parity group 100 may be divided to form a plurality of logical devices (LDEV) 110, or a plurality of parity groups 100 may be collected to form one logical device 110.

Logical units (LU) 120, 130 and 140 are respectively mapped to the ports 21, 31 and 41. Each of the logical units 120, 130 and 140 is a logical unit for storage recognized by the host systems 700 and 800. For example, if the host systems 700 and 800 are UNIX® systems, the logical units 120, 130 and 140 are associated with device files (Device Files). Or, if the host systems 700 and 800 are Windows® systems, the logical units 120, 130 and 140 are associated with drive letters (Drive Names). A unique LUN (Logical Unit Number) is assigned to each of the logical units 120, 130 and 140.

A single or a plurality of logical devices 110 are mapped to each of the logical units 120, 130 and 140. If the host systems 700 and 800 are open systems, the host systems 700 and 800 recognize each logical device 110 as a physical device, and access a desired logical device 110 by designating the LUN or logical block address. If the host systems 700 and 800 are mainframe systems, the host systems 700 and 800 directly recognize the logical devices 110.

Figure 3:
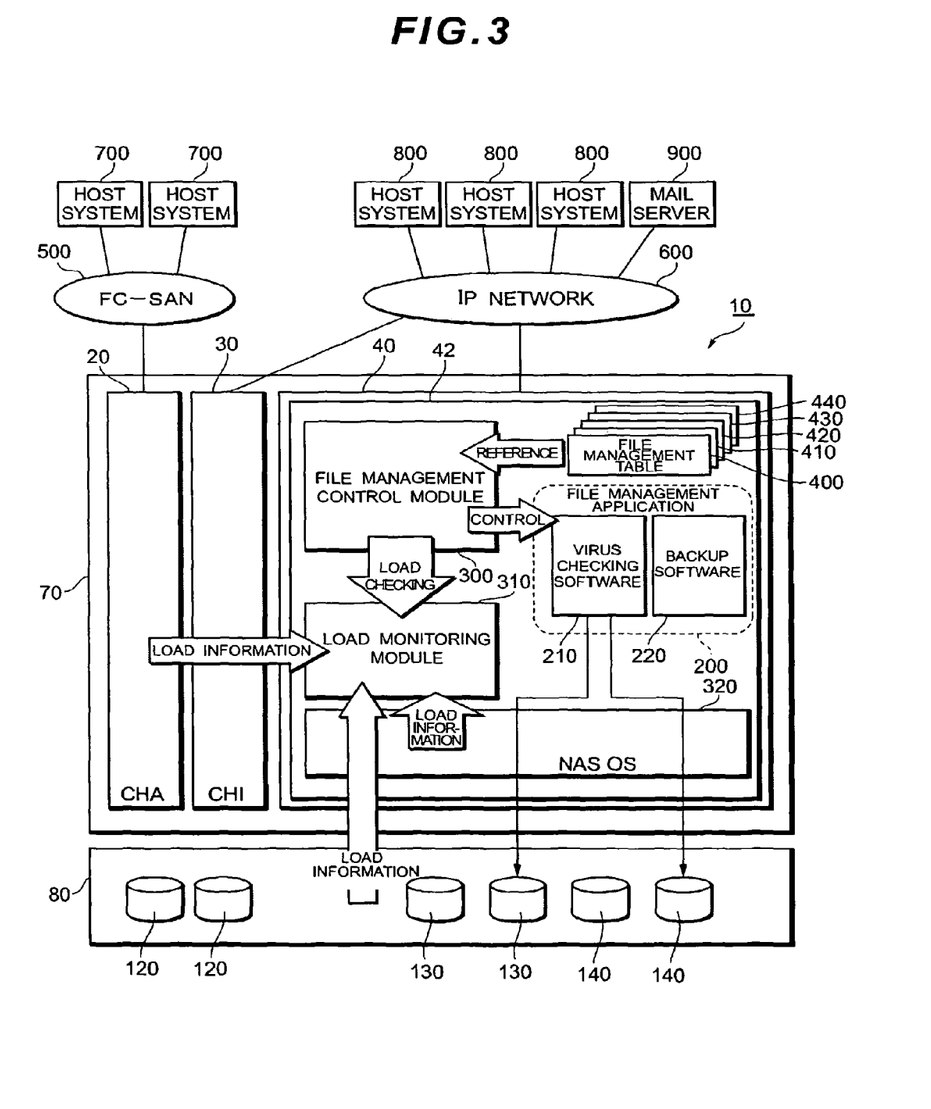
FIG. 3 is a functional block diagram of the storage system according to the present embodiment, focusing on its file management function.

FIG. 3 shows the functional blocks of the storage system 10, focusing on its file management function. The same reference numerals used in FIG. 1 indicate the same devices, and so their detailed explanation is omitted.

The NAS processor 42 makes a file management control module 300 and a load monitoring module 310 operate on a NAS operating system 320 to control file management application software 200. The file management application software 200 is software for managing, on a per-file basis, a plurality of files stored in the respective logical units 120, 130 and 140. Examples of such file management application software are virus checking software 210 for conducting virus checking on a per-file basis, and backup software 220 for making data backups on a per-file basis.

The load monitoring module 310 monitors the resource load in the storage system 10. Resource load information includes, for example, processor utilization of the NAS processor 42, processor utilization of the storage controller 43, processor utilization of the channel adapters 20, 30 and 40, processor utilization of the disk adapters 60, the I/O load in the parity groups 100, the I/O load in the logical devices 110, the I/O load in the logical units 120, 130 and 140, the I/O load in the ports 21, 31 and 41, utilization or cache hit rate of the cache memory 51, and utilization of the interconnection network 50. An I/O load may be indicated by, for example, the I/O rate (amount of I/O per unit time), or the data size of input/output data. The above resource load information is stored in the shared memory 52. The load monitoring module 310 can acquire the resource load information from the shared memory 52.

The file management control module 300 references a file management table 400, a threshold management table 410, an LU management table 420, a rule management table 430, and a virus detection list 440 to control the file management application software 200. Acquiring the resource load information from the load monitoring module 310, the file management control module 300 controls start/stop of the file management application software 200 or changes the logical units to be mounted on the NAS processor 42 so that each resource in the storage system 10 has an evenly balanced load. If the I/O load in the file management target logical units increases, or if the load in the NAS processor 42 increases, the file management control module 300 records the progress of the ongoing file management in the file management table 400 and temporarily stops that file management. When the I/O load in the logical units or the load in the NAS processor 42 then decreases, the file management control module 300 resumes the suspended file management (resume function).

In addition, while the storage system 10 responds to I/O requests from the host systems 700 and 800 for their normal operations, it runs the file management control module 300 to control file management for the respective logical units 120, 130 and 140 in the background.

FIG. 4 shows a file management table 400. The file management table 400 is a table for managing a file management execution ranking per logical unit as well as managing, for example, marker information for resuming file management via the resume function. Each record in the file management table 400 has the respective columns for storing a management number 401, a LUN 402, a priority 403, a load status 404, an execution ranking 405, an execution result 406, a resumption marker 407, a skip count 408, and an LU type 409.

The management number 401 is a number for managing each record in the file management table 400. The LUN 402 indicates the LUN of each file management target logical unit. The priority 403 shows a file management priority designated by a user. A user can designate the file management priority per logical unit. The load status 404 indicates the load status of each logical unit, "1" being recorded in this column if the I/O load in a logical unit is equal to or over a threshold, and "0" if less than the threshold. A threshold 414 or 415 in the threshold management table 410 is used as the threshold for determining the load status of a logical unit.

The execution ranking 405 shows the rank in the file management execution order. The execution ranking 405 is determined based on the priority 403 designated by a user together with the load status 404 in each logical unit. For example, if there is a logical unit with the load status of "0" and a logical unit with "1" at the same time, the ranking of the logical unit with the load status of "0" will be raised over the logical unit with the load status of "1." By this operation, it is possible to execute file management preferentially for a lightly-loaded logical unit and to properly balance the resource load. The execution result 406 shows the file management completion rate. In this column, a value of 100% is recorded if file management has been completed for all files in a logical unit, and a value of 0% is recorded if file management has not been performed, i.e., the initial value is 0%. The resumption marker 407 is marker information for resuming file management via the resume function. The skip count 408 shows the number of file management suspensions. If the I/O load in a logical unit increases during the execution of file management, that file management is suspended. The LU type 409 shows the type of interface (CHA, CHI, or CHN) connected to each logical unit.

FIG. 5 shows a threshold management table 410. The threshold management table 410 stores thresholds 411 to 415 for determining the load status of each resource. The threshold 411 is a CPU utilization threshold to be used as a standard for determining if the NAS processor 42 is heavily loaded or not. The threshold 412 is a processor utilization threshold to be used as a standard for determining if the storage controller 43 is heavily loaded or not. The threshold 413 is a processor utilization threshold to be used as a standard for determining if the CHA and CHI are heavily loaded or not. The threshold 414 is an I/O rate threshold to be used as a standard for determining if each parity group 100 is heavily loaded or not. The threshold 415 is an I/O rate threshold to be used as a standard for determining if each of the logical units 120, 130 and 140 is heavily loaded or not.

FIG. 6 shows an LU management table 420. The LU management table 420 is a table for managing each logical unit. Each record in the LU management table 420 has columns for storing a LUN 421, a connected host name 422, an administrator's e-mail address 423, a connection I/F 424, and parity groups 425, 426 and 427. The LUN 421 shows the LUN of each file management target logical unit. The connected host name 422 shows the names of the host systems 700 and 800 connected to each management target logical unit. The administrator's e-mail address 423 is an e-mail address for an administrator managing each logical unit. The connection I/F 424 shows the type of interface (CHA, CHI, or CHN) connected to each logical unit. The parity groups 425, 426 and 427 show parity groups mapped to each management target logical unit.

Figure 7:
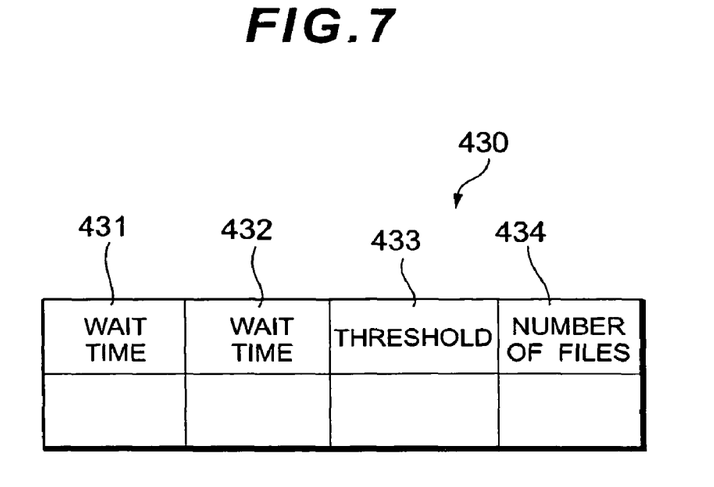
FIG. 7 is an explanatory diagram of a rule management table.

FIG. 7 shows a rule management table 430. The rule management table 430 is a table for establishing rules for file management. The file management table 430 has columns for storing a wait time 431, a wait time 432, a threshold 433, and the number of files 434. The wait times 431 and 432 specify an interval until the load in the NAS processor 42 is rechecked during the execution of load checking subroutines (FIGS. 13 and 14) for the NAS processor 42. The load checking subroutines for the NAS processor 42 will be explained later. The threshold 433 indicates a threshold for the number of suspensions of file management. When the number of file management suspensions exceeds the threshold 433, an administrator may be informed by e-mail that the file management has not been completed. The number of files 434 shows the number of files for which file management will be executed at one time.

Figure 8:
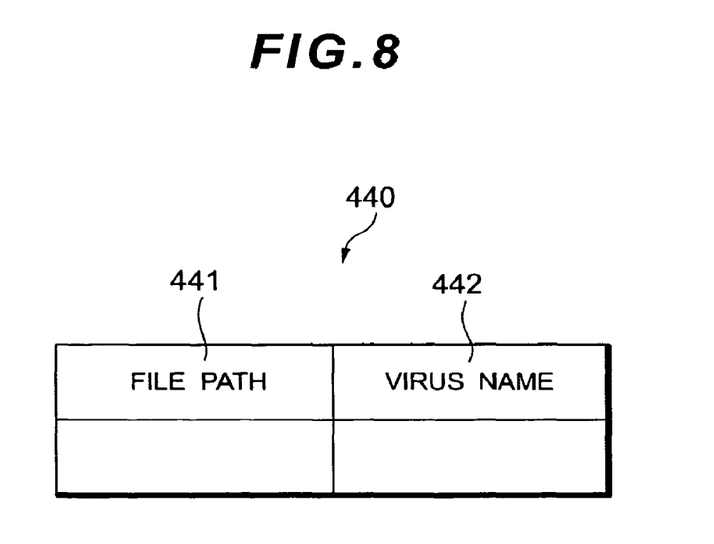
FIG. 8 is an explanatory diagram of a virus detection list.

FIG. 8 shows a virus detection list 440. The virus detection list 440 is a list for managing virus information. The virus detection list 440 has columns for storing a file path 441 and a virus name 442. The file path 441 shows a virus-infected file path. The virus name 442 shows the name of a detected virus.

Figure 13:
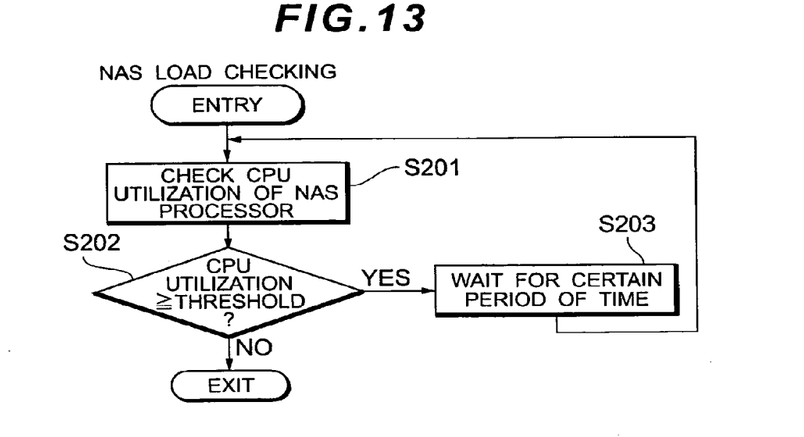
FIG. 13 is a flowchart showing a subroutine for performing load checking for a NAS processor.
Figure 14:
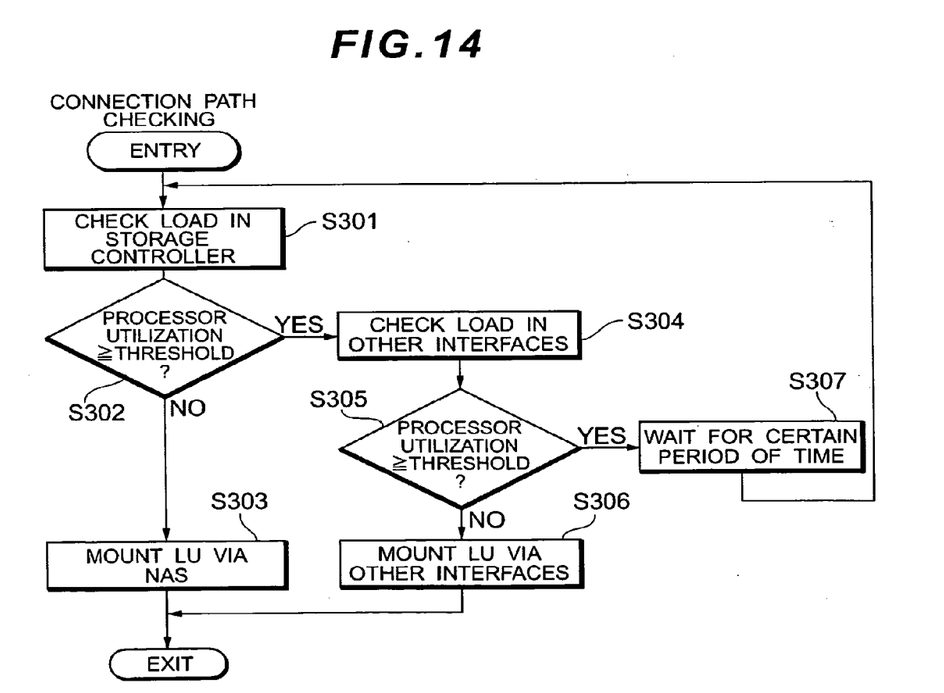
FIG. 14 is a flowchart showing a subroutine for performing connection path checking.
Figure 15:
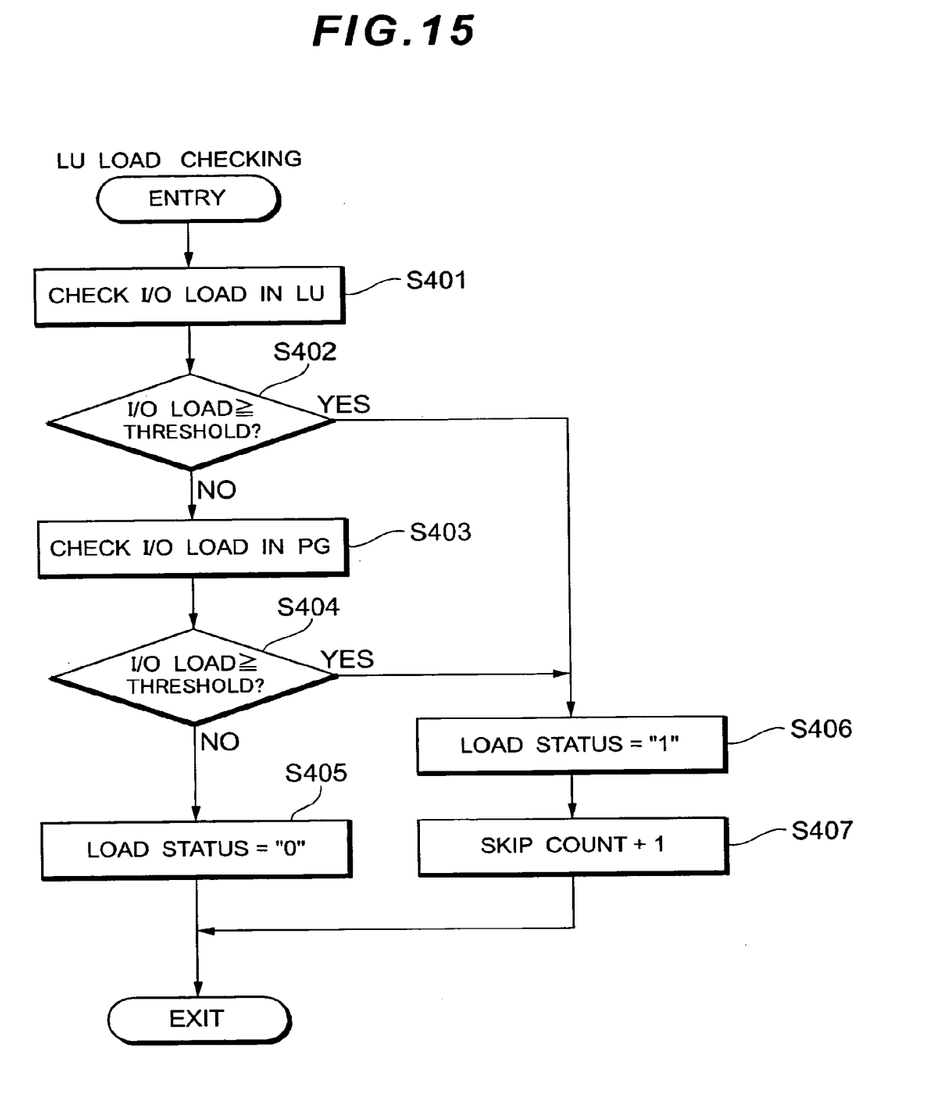
FIG. 15 is a flowchart showing a subroutine for performing LU load checking.

Next, a file management method conducted by the file management control module 300 is explained with reference to FIGS. 9 to 15. As one example of file management, virus checking is explained below. However, the present invention is not limited to this example, but may be applied to file management where a plurality of files are subjected to batch processing on a per-file basis (data backup on a per-file basis, for instance). FIGS. 9 to 12 show the main routine for the virus checking, and FIGS. 13 to 15 show subroutines for the virus checking.

Figure 9:
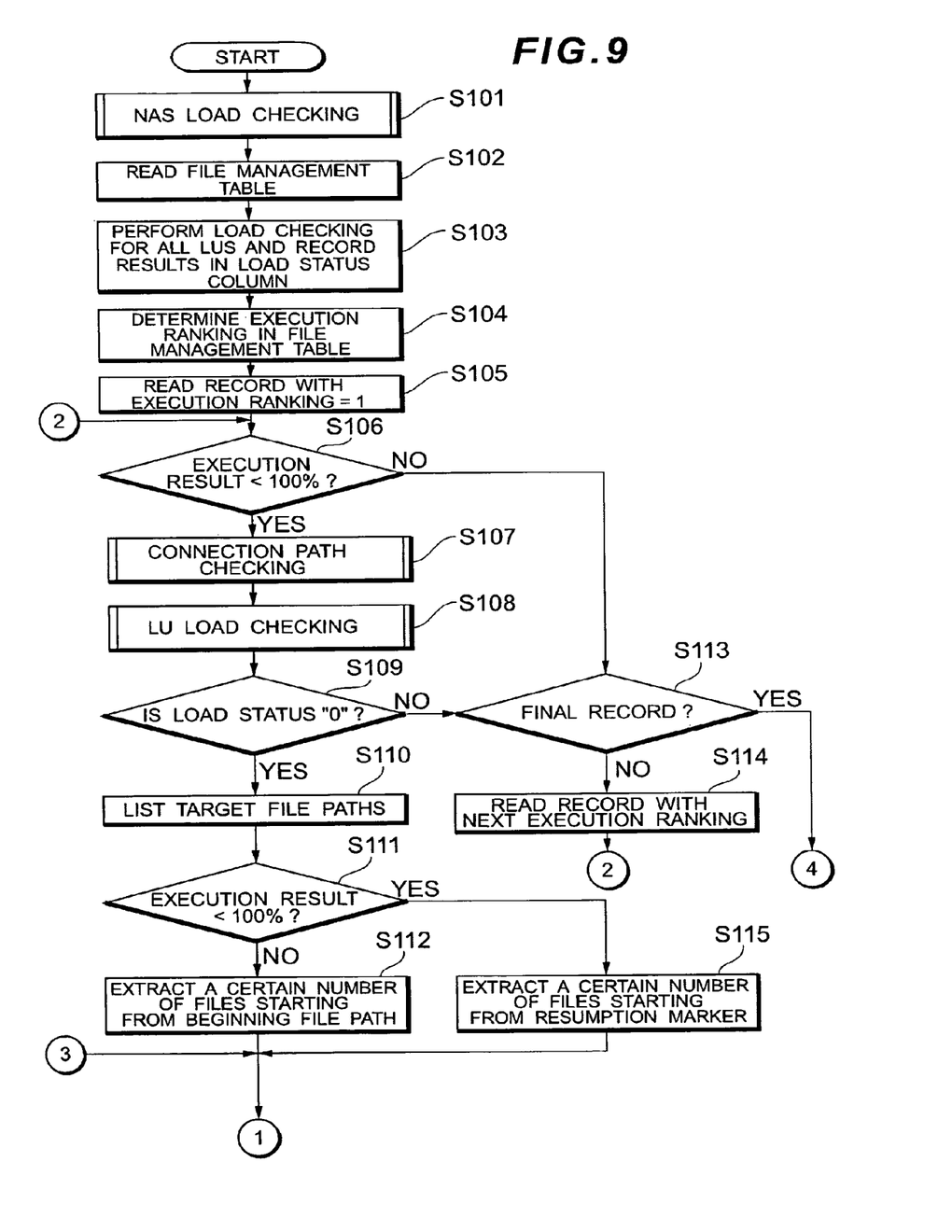
FIG. 9 is a flowchart showing the main routine for virus checking.

First referred to is FIG. 9. The file management control module 300 calls the virus checking main routine and performs load checking for the NAS processor 42 (S101). In this load checking, the subroutine described in FIG. 13 is called to examine the CPU utilization of the NAS processor (S201). The CPU utilization is then compared with the threshold 411 in the threshold management table 410 (S202). If the CPU utilization is at the threshold 411 or over (S202; Yes), the routine goes on standby until the wait time 431 specified in the rule management table 430 expires (S203), and then returns to S201. If the CPU utilization is less than the threshold (S202; No), the subroutine is exited.

Figure 16A:
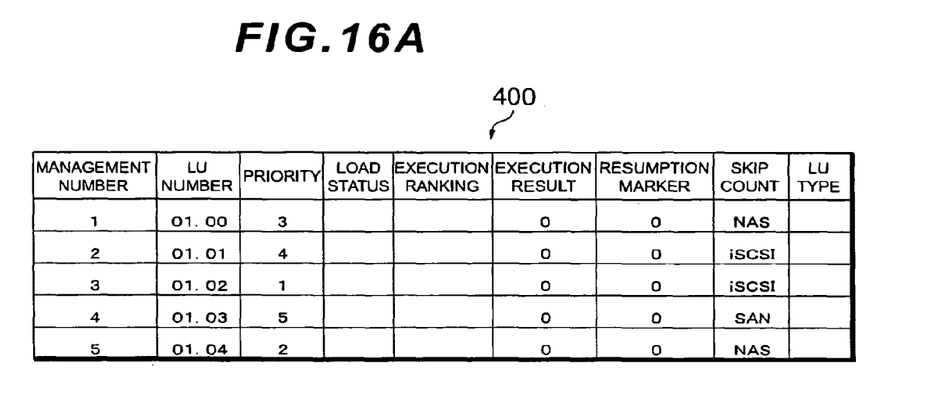
FIGS. 16A to 16C are explanatory diagrams showing transitional states of the file management table.

The file management control module 300 next reads the file management table 400 (S102). The file management table 400 read at this stage is a table of the initial state, as shown in FIG. 16A, where the file management priority 403 has been determined, but the load status 404 and the execution ranking 405 have not.

Subsequently, the file management control module 300 checks the I/O load in all logical units, and records either "0" or "1" in the respective columns for the load status 404 in the file management table 400 (S103). If the I/O rate of the parity group 100 is used as the I/O load in each logical unit, the file management control module 300 compares the I/O rate of the parity group 100 with the threshold 414 in the threshold management table 410, and records "0" in the column for the load status 404 if the former is smaller than the latter and records "1" in the column for the load status 404 if the former is the same as or over the latter. If the I/O rate of each logical unit 120, 130 or 140 is used as the I/O load in each logical unit, the file management control module 300 compares the I/O rate of each logical unit 120, 130 or 140 with the threshold

415 in the threshold management table 410, and records "0" in the column for the load status 404 if the former is smaller than the latter and records "1" in the column for the load status 404 if the former is the same as or over the latter.

Here, if a plurality of parity groups 100 are collected to form a single logical unit 120, 130 or 140, further accurate load checking can be performed by checking the I/O load in the parity groups 100.

Figure 16B:
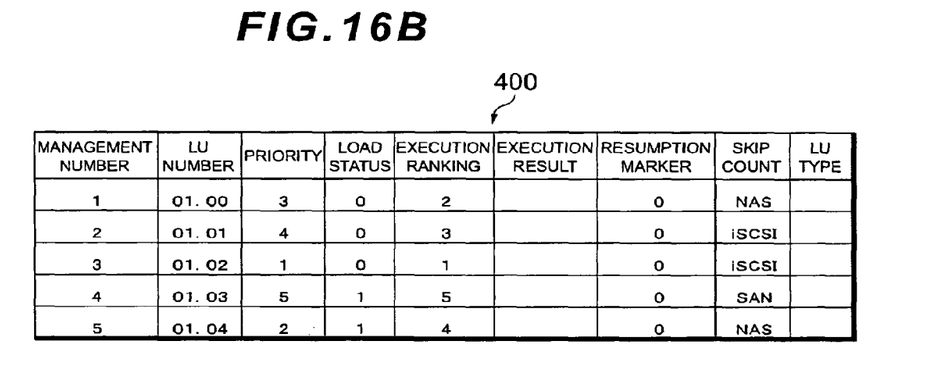

The file management control module 300 next determines the file management execution ranking (S104). The file management execution ranking can be determined based on the priority 403 designated by a user and the load status 404 of each logical unit 120, 130 or 140. The execution ranking 405 is determined in principle as the priority 403 is, but if there is a logical unit with the load status of "0" and a logical unit with the load status of "1" at the same time, the ranking of the logical unit with load status of "0" is preferentially raised. FIG. 16B shows the file management table 400 after the execution ranking 405 has been determined.

Then, the file management control module 300 reads the record with the execution ranking 405 of "1" from the file management table 400 (S105), and checks whether its execution result 406 is less than 100% or not (S106).

If the execution result 406 is less than 100% (S106; Yes), the file management control module 300 performs connection path checking (S107). In this connection path checking, the subroutine shown in FIG. 14 is called to examine the processor utilization of the storage controller 43 (S301). The processor utilization is then compared with the threshold 412 in the threshold management table 410 (S302). If the processor utilization is the same as or over the threshold 412 (S302; Yes), the file management control module 300 checks the processor utilization of the other interfaces CHA/CHI (S304).

The processor utilization of the other interfaces CHA/CHI is then compared with the threshold 413 in the threshold management table 410 (S305). If the processor utilization of the other interfaces CHA/CHI is the same as or over the threshold 413 (S305; Yes), the file management control module 300 waits for the expiration of the wait time 432 specified in the rule management table 430 (S307), and then returns to S301.

Meanwhile, if the processor utilization of the storage controller 43 is less than the threshold 412 (S302; No), the NAS processor 42 mounts the logical units 120, 130 and 140 via the storage controller 43 (S303), and the subroutine is exited. Or, if the processor utilization of the other interfaces CHA/CHI is less than the threshold 413 (S305; No), the NAS processor 42 mounts the logical units 120, 130 and 140 via those other interfaces CHA/CHI (S306), and the subroutine is exited.

As stated above, even if the NAS processor 42 is heavily loaded, when the other interfaces CHA/CHI are lightly loaded, the NAS processor 42 mounts the logical units 120, 130 and 140 via those other interfaces CHA/CHI, so the resource load can be properly balanced.

Next, the file management control module 300 performs load checking for a file management target logical unit (S108). In this load checking, the subroutine shown in FIG. 15 is called to examine the I/O load in the file management target logical unit (S401). The I/O load in the target logical unit is then compared with the threshold 415 in the threshold management table 410 (S402). If the I/O load in the logical unit is the same as or over the threshold 415 (S402; Yes), "1" is recorded in the column for the load status 404 in the file management table 400 (S406). Then, the skip count 408 is incremented by one (S407), and the subroutine is exited.

Meanwhile, if the I/O load in the logical unit is less than the threshold 415 (S402; No), the file management control module 300 checks the I/O load in the parity group to which the file management target logical unit is mapped (S403). The I/O load in the parity group is then compared with the threshold 414 in the threshold management table 410 (S404). If the I/O load in the parity group is the same as or over the threshold 414 (S402; Yes), the file management control module 300 records "1" in the column for the load status 404 in the file management table 400 (S406).

If the I/O load in the parity group is less than the threshold 414 (S404; No), the file management control module 300 records "0" in the column for the load status 404 in the file management table 400 (S405), and the subroutine is exited.

Then, the file management control module 300 checks whether the load status 404 of the file management target logical unit is "0" or not (S109). If it is "0" (S109; Yes), the file management control module 300 lists the file paths of the file management target files (S110), and then checks the execution result 406 (S111). If the execution result 406 is 0%, the file management control module 300 extracts a certain number of files starting from the beginning of the listed file paths (S112), and moves to S116. The number of files extracted in this step is the same as the number of files 434 in the rule management table 430.

If the execution result 406 is more than 0% and less than 100%, the file management control module 300 extracts a certain number of files by referring to the resumption marker 407 in the file management table 400 (S115), and moves to S116.

If the execution result 406 is 100% (S106; No), or if the load status 404 is "1" (S109; No), the file management control module 300 checks if the concerned record is the final record in the file management table 400 or not (S113). If it is not the final record (S113; No), the file management control module 300 reads the record having the next execution ranking 405 (S114), and moves to S106. If it is the final record (S113; Yes), the file management control module 300 moves to S133.

Figure 10:
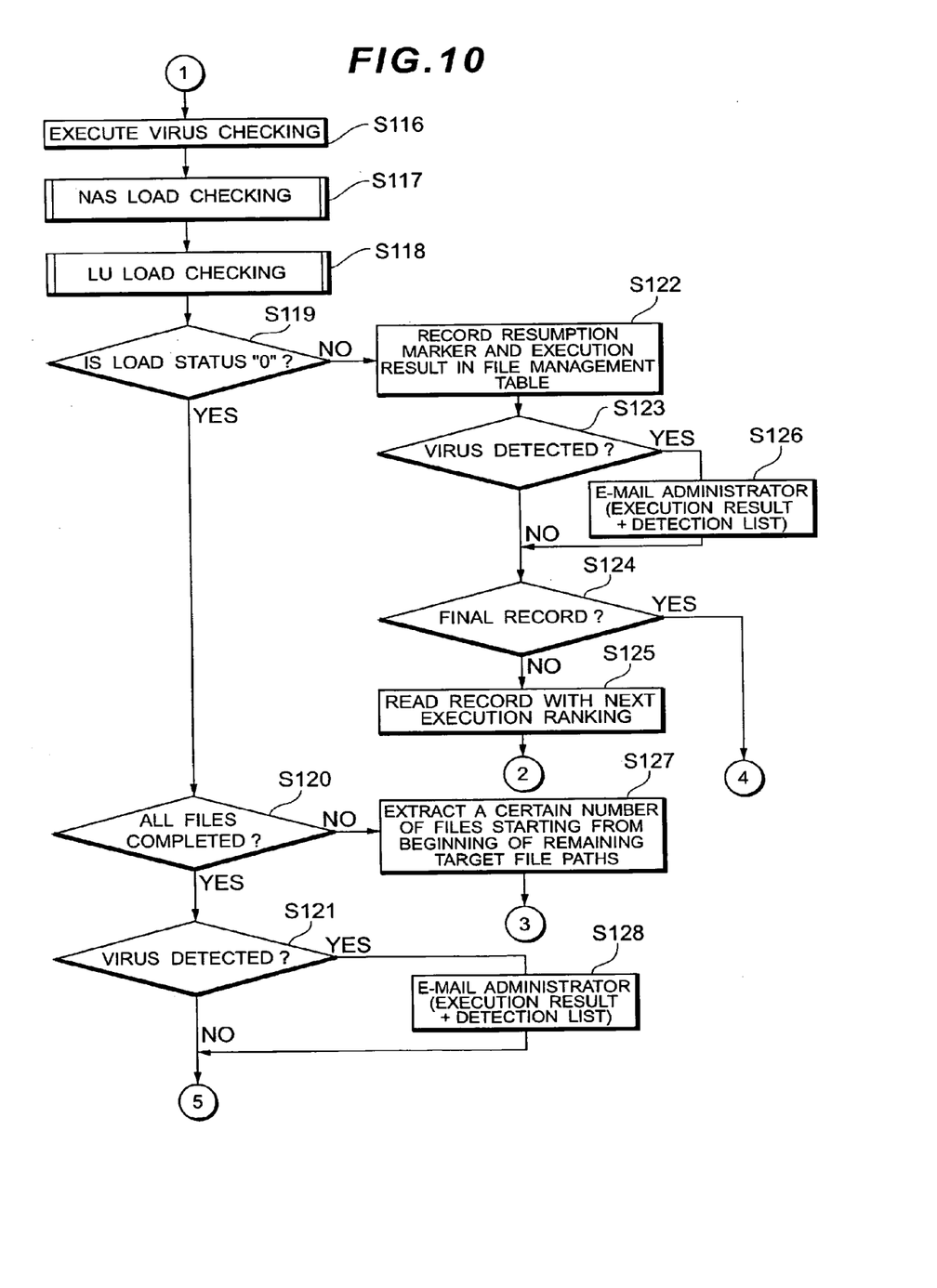
FIG. 10 is a flowchart showing the main routine for virus checking.

Next referred to is FIG. 10. The file management control module 300 performs virus checking, in a batch, for a certain number of files extracted from the logical unit, and if it detects any virus, it records the infected file path in the column for the file path 441 in the virus detection list 440 and also records the name of the virus in the column for the virus name 442 (S116).

The file management control module 300 next performs load checking for the NAS processor 42 (S117). In this load checking, the subroutine shown in FIG. 13 is called to conduct the steps S201 through S203.

The fife management control module 300 then performs load checking for the file management target logical unit (S118). In this load checking, the subroutine shown in FIG. 15 is called to conduct the steps S401 through S407.

The file management control module 300 next checks whether the load status 404 of the file management target logical unit is "0" or not (S119). If it is "0" (S119; Yes), the file management control module 300 checks whether file management has been completed for all files in the relevant logical unit (S120) or not.

If file management has been completed for only some of the files in the relevant logical unit (S120; No), the file management control module 300 extracts a certain number of files starting from the beginning of the remaining file paths for which file management has not been completed (S127), and moves to S116.

If file management has been completed for all files in the relevant logical unit (S120; Yes), the file management control module 300 checks whether any virus has been detected or not (S121). If no virus has been detected (S121; No), the file management control module 300 goes to S129.

If a virus has been detected (S121; Yes), the file management control module 300 reports the processing results (for instance, an alarm indicating virus detection) to the e-mail address registered in the column for the administrator's e-mail address 423 in the LU management table 420 (S128), and goes to S129.

Meanwhile, if the load status is "1" (S119; Yes), the file management control module 300 records marker information in the column for the resumption marker 407 in the file management table 400, and also records the completion rate in the column for the execution result 406 (S122).

The file management control module 300 then checks whether any virus has been detected or not (S123). If a virus has been detected, the file management control module 300 reports the processing results (for instance, an alarm indicating virus detection) to the e-mail address registered in the column for the administrator's e-mail address 423 in the LU management table 420 (S126).

If no virus has been detected (S123; No), or if the virus detection e-mail has been forwarded (S126), the file management control module 300 checks if the concerned record is the final record in the file management table 400 or not (S124).

If it is the final record (S124; Yes), the file management control module 300 moves to S133. If it is not the final record (S124; No), the file management control module 300 reads the record having the next execution ranking (S125), and moves to S106.

Figure 11:
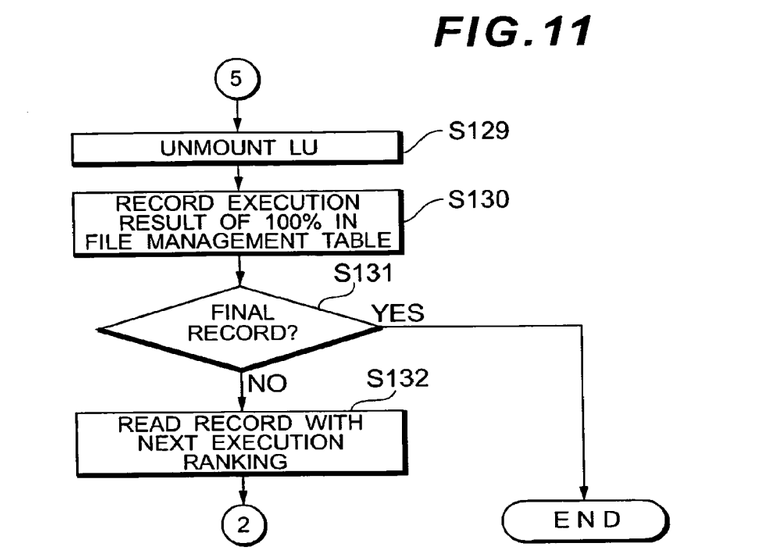
FIG. 11 is a flowchart showing the main routine for virus checking.

Next, FIG. 11 is referred to. The file management control module 300 unmounts the logical unit for which file management has been executed (S129), and records a completion rate of 100% in the column for the execution result 406 in the file management table 400 (S130).

Then, the file management control module 300 checks if the relevant record is the final record in the file management table 400 or not (S131). If it is the final record (8131; Yes), the main routine is ended. If it is not (S131; No), the file management control module 300 reads the record having the next execution ranking (S132), and goes to S106.

Figure 12:
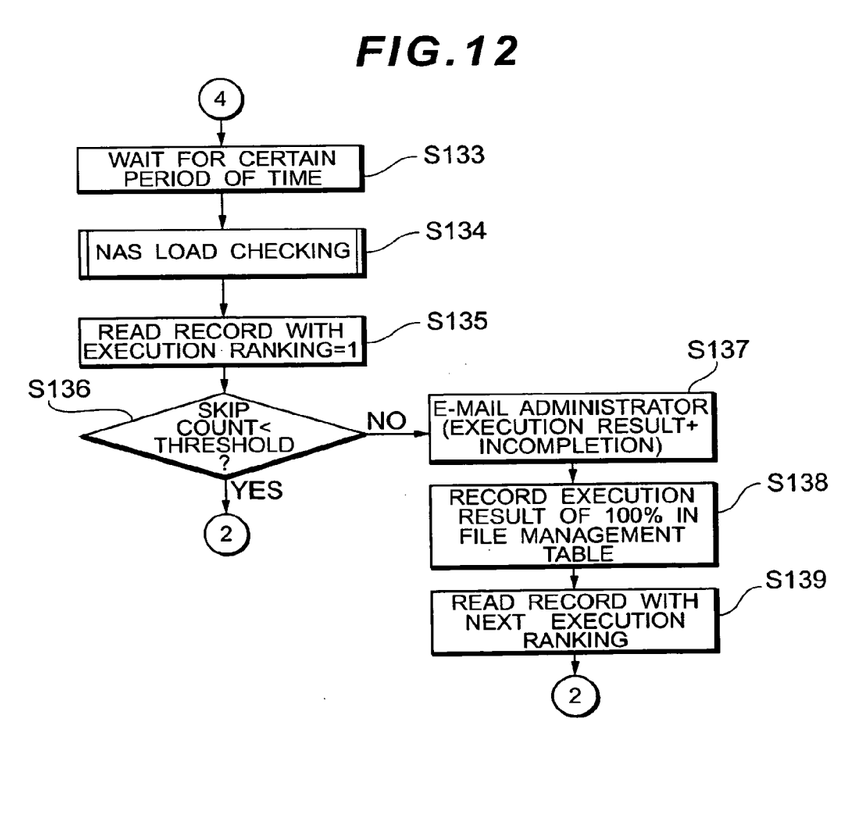
FIG. 12 is a flowchart showing the main routine for virus checking.

FIG. 12 is referred to next. The file management control module 300 waits for the expiration of a certain period of time (S133), and then performs load checking for the NAS processor 42 (S134). In this load checking, the subroutine shown in FIG. 13 is called to conduct the steps of S201 through S203.

The file management control module 300 then reads the record having the execution ranking 405 of "1" from the file management table 400 (S135), and checks if its skip count 408 in the file management table 400 is smaller than the threshold 433 in the rule management table 430 (S136). If the skip count 408 is smaller than the threshold 433 (S136; Yes), the file management control module 300 goes to S106.

If the skip count 408 is the same as or over the threshold 433 (S136; No), the file management control module 300 reports the processing results (for example, an alarm indicating that virus checking has not been completed due to the heavy load in the logical unit) to the e-mail address registered in the column for the administrator's e-mail address 423 in the LU management table 420 (S137).

The file management control module 300 then records a completion rate of 100% in the column for the execution result 406 in the file management table 400 (S138), reads the record having the next execution ranking (S139), and then goes to S106.

Figure 16C:
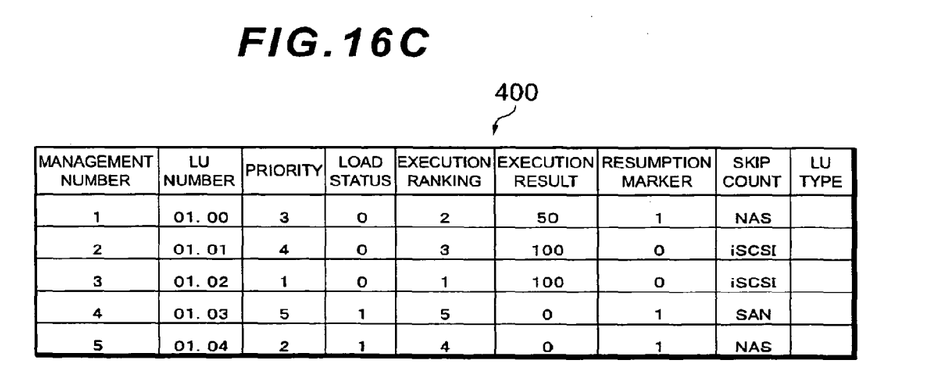

By following the above described steps, virus checking is performed on a per-file basis. FIG. 16C shows the progress of ongoing virus checking. In the example shown in this diagram, it can be seen that virus checking for a logical unit with the LUN "01.00" has been suspended with an execution result of 50%, and that virus checking for the logical units with the LUNs "01.03" and "01.04" is in an incomplete state.

According to the present embodiment, file management is performed by prioritizing a lightly-loaded logical unit, whereby it is possible to distribute the resource load in the storage system 10 so that the resources do not have an unevenly heavy load.

Furthermore, by employing the resume function of temporarily suspending file management for a logical unit if its load becomes heavy, and resuming file management upon the load becoming light, it is possible to properly balance the load in the storage system 10 and reduce deterioration in the processing performance.

Moreover, if the CHN is heavily loaded, the NAS processor 42 mounts the logical units via the CHA or the CHI and then file management is performed. Accordingly, proper load balancing can be realized in the storage system 10.

The invention claimed is:

1. A storage system comprising:
a plurality of memory devices configuring a plurality of logical units;
a processor managing a plurality of files stored in the respective logical units, and monitoring an input/output load for each of the plurality of logical units;
a memory storing a file management table for managing a predetermined priority for each of the plurality of logical units, the input/output load for each of the plurality of logical units, and a file management execution ranking for each of the plurality of logical units;
one or more block input/output interfaces; and
one or more file input/output interfaces,
wherein the file management execution ranking indicates an order of managing the files stored in the plurality of logical units,
wherein the file management execution ranking is determined by arranging the plurality of logical units in order of the predetermined priority, and then further arranging the plurality of logical units based on the input/output load of each of the plurality of logical units,
wherein the processor measures the input/output load of each of the plurality of logical units and determines whether the input/output load of each of the plurality of logical units is less than a predetermined threshold,
wherein the logical units having an input/output load that is less than the predetermined threshold are first logical units, and the logical units having an input/output load that is greater than the predetermined threshold are second logical units,
wherein the first logical units are arranged in order of the predetermined priority, and after the first logical units are arranged in order of the predetermined priority, the second logical units are arranged in order of the predetermined priority, the first logical units being arranged higher in priority than the second logical units,
wherein the processor executes managing the files stored in the plurality of logical units in order of the determined file management execution ranking,
wherein one or more of the plurality of logical units are provided to a SAN (Storage Area Network) client via the one or more block input/output interfaces, and another or more of the plurality of logical units are provided to a NAS (Network Attached Storage) client via the one or more file input/output interfaces, and
wherein, if the load in one of the one or more file input/output interfaces reaches or exceeds a predetermined threshold, the one file input/output interface mounts the plurality of logical units via another of the one or more file input/output interfaces or the one or more block input/output interfaces, and controls the file management.

2. The storage system according to claim 1, wherein the file management control module controls start/stop of the file management application software, mounting/dismounting of one or more file management target logical units from among the plurality of logical units, and resumption of the file management.

3. The storage system according to claim 2, wherein, when the input/output load of one of the plurality of logical units reaches or exceeds a predetermined threshold, the file management control module dismounts the one logical unit to suspend the file management for the one logical unit.

4. The storage system according to claim 3, wherein, when the input/output load of the one of the plurality of logical units becomes less than the predetermined threshold, the file management control module re-mounts the dismounted one logical unit to resume the file management for the one logical unit.

5. The storage system according to claim 4, wherein, when the number of file management suspensions for the one of the plurality of logical units reaches or exceeds a predetermined threshold, the file management control module stops the file management for the one logical unit and performs the file management for another of the plurality of logical units.

6. The storage system according to claim 1, wherein the file management application software, the load monitoring module, and the file management control module run on the one or more file input/output interfaces.

7. The storage system according to claim 1, wherein the storage system performs input/output processing in response to a request from the SAN client or the NAS client, and also performs the file management in a background.

8. The storage system according to claim 1, wherein the file management control module reports a file management processing result to an administrator by e-mail.

9. The storage system according to claim 1, wherein the file management application software is virus checking software or backup software.

10. A method of managing files in a storage system, the storage system comprising: a plurality of memory devices configuring a plurality of logical units; a processor managing a plurality of files stored in the respective logical units, and monitoring an input/output load for each of the plurality of logical units; a memory storing a file management table for managing a predetermined priority for each of the plurality of logical units, the input/output load for each of the plurality of logical units, and a file management execution ranking for each of the plurality of logical units; one or more block input/output interfaces; and one or more file input/output interfaces, wherein the file management execution ranking indicates an order of managing the files stored in the plurality of logical units, the method comprising:
  determining the file management execution ranking by arranging the plurality of logical units in order of the predetermined priority, and then further arranging the plurality of logical units based on the input/output load of each of the plurality of logical units;
  measuring, by the processor, the input/output load of each of the plurality of logical units;
  determining, by the processor, whether the input/output load of each of the plurality of logical units is less than a predetermined threshold,
  wherein the logical units having an input/output load that is less than the predetermined threshold are first logical units, and the logical units having an input/output load that is greater than the predetermined threshold are second logical units;
  arranging the first logical units in order of the predetermined priority, and after the first logical units are arranged in order of the predetermined priority, arranging the second logical units in order of the predetermined priority, the first logical units being arranged higher in priority than the second logical units;
  managing, by the processor, the files stored in the plurality of logical units in order of the determined file management execution ranking,
  wherein one or more of the plurality of logical units are provided to a SAN (Storage Area Network) client via the one or more block input/output interfaces, and another or more of the plurality of logical units are provided to a NAS (Network Attached Storage) client via the one or more file input/output interfaces; and
  if the load in one of the one or more file input/output interfaces reaches or exceeds a predetermined threshold, mounting, by the one file input/output interface the plurality of logical units via another of the one or more file input/output interfaces or the one or more block input/output interfaces, and controls the file management.

11. The method according to claim 10, further comprising:
  controlling, by the file management control module, starting/stopping of the file management application software, mounting/dismounting of one or more file management target logical units from among the plurality of logical units, and resumption of the file management.

12. The method according to claim 11, further comprising:
  when the input/output load of one of the plurality of logical units reaches or exceeds a predetermined threshold, dismounting, by the file management control module, the one logical unit to suspend the file management for the one logical unit.

13. The method according to claim 12, further comprising:
  when the input/output load of the one of the plurality of logical units becomes less than the predetermined threshold, re-mounting, by the file management control module, the dismounted one logical unit to resume the file management for the one logical unit.

14. The method according to claim 13, further comprising:
  when the number of file management suspensions for the one of the plurality of logical units reaches or exceeds a predetermined threshold, stopping, by the file management control module, the file management for the one logical unit, and performing the file management for another of the plurality of logical units.

15. The method according to claim 10, wherein the file management application software, the load monitoring module, and the file management control module run on the one or more file input/output interfaces.

16. The method according to claim 10, further comprising:
  performing input/output processing in response to a request from the SAN client or the NAS client, and also performing the file management in a background.

17. The method according to claim 10, further comprising:
  reporting, by the file management control module, a file management processing result to an administrator by e-mail.

18. The method according to claim 10, wherein the file management application software is virus checking software or backup software.

* * * * *